(12) United States Patent
Frey

(10) Patent No.: US 9,101,858 B2
(45) Date of Patent: Aug. 11, 2015

(54) SELF-CLEANING SEPTIC TANK FILTER

(71) Applicant: Phillip Clark Frey, Bigfork, MT (US)

(72) Inventor: Phillip Clark Frey, Bigfork, MT (US)

( * ) Notice: Subject to any disclaimer, the term of this patent is extended or adjusted under 35 U.S.C. 154(b) by 375 days.

(21) Appl. No.: 13/721,016

(22) Filed: Dec. 20, 2012

(65) Prior Publication Data

US 2013/0180902 A1 Jul. 18, 2013

Related U.S. Application Data

(60) Provisional application No. 61/586,063, filed on Jan. 12, 2012.

(51) Int. Cl.
 *B01D 29/64* (2006.01)
 *B01D 35/027* (2006.01)
 *B01D 36/04* (2006.01)

(52) U.S. Cl.
 CPC ........ *B01D 29/6423* (2013.01); *B01D 35/0276* (2013.01); *B01D 36/04* (2013.01)

(58) Field of Classification Search
 CPC .......................... B01D 29/6423; B01D 29/643
 See application file for complete search history.

(56) References Cited

U.S. PATENT DOCUMENTS

| | | | | |
|---|---|---|---|---|
| 785,125 | A * | 3/1905 | Shafer ........................... | 210/241 |
| 6,338,797 | B1 * | 1/2002 | Nurse et al. ................... | 210/238 |
| 7,413,656 | B2 * | 8/2008 | Allen et al. .................... | 210/622 |
| 8,038,889 | B2 * | 10/2011 | Munn ............................ | 210/744 |
| 8,377,291 | B2 * | 2/2013 | Eckman ......................... | 210/86 |

* cited by examiner

*Primary Examiner* — Terry Cecil

(57) ABSTRACT

There is disclosed an automatic cleaning apparatus for a septic tank filter. The cleaning apparatus has a brush operable to move across a screen disposed internally of the filter. The brush is tethered, via a cable and at least one pulley, to a weighted float disposed in an effluent pump chamber associated with the septic tank. The brush therefore moves vertically across the screen with vertical changes the level of effluent in the septic tank.

1 Claim, 4 Drawing Sheets

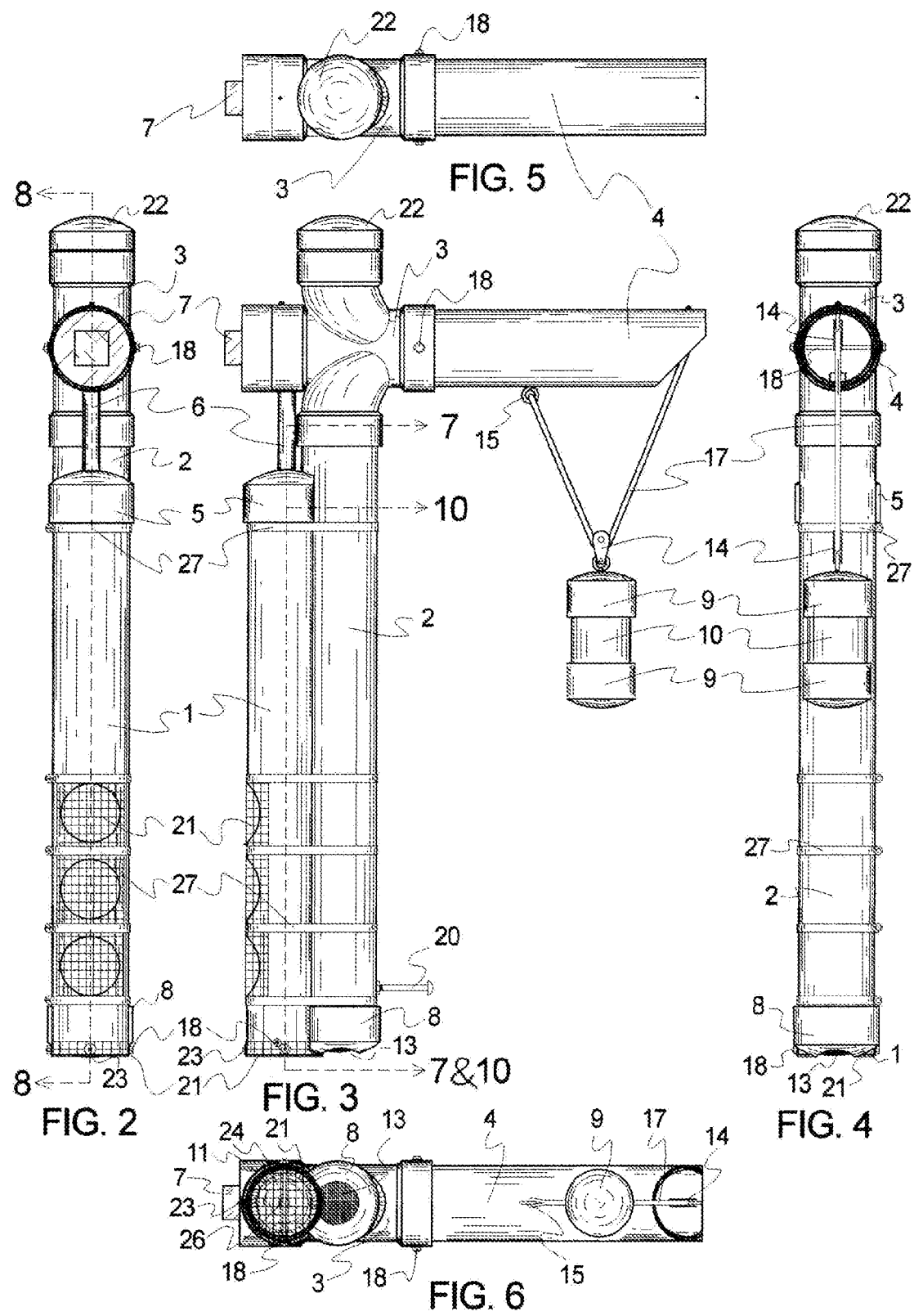

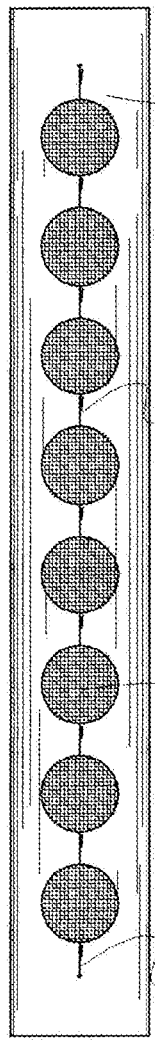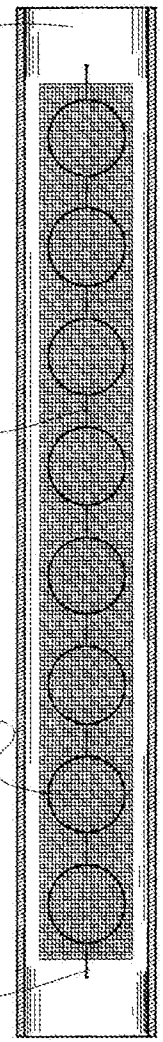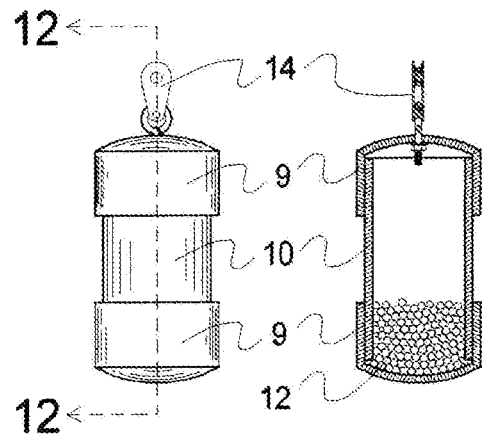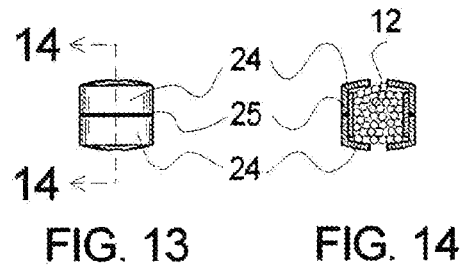
FIG. 9  FIG. 10  FIG. 11  FIG. 12  FIG. 13  FIG. 14

SELF-CLEANING SEPTIC TANK FILTER

This application claims priority to provisional application 61/586,063.

BACKGROUND OF THE INVENTION

Septic tank filters can be bypassed as a result of becoming clogged. This invention will keep the filter clean.

Septic tank filters become clogged and generally are not cleaned as often as necessary. Servicing most present-day filters requires opening the septic tank, manually removing the filter screen and washing it with either a hose or in a bucket; a messy and unsanitary job. Once the filter screens are clogged, waste from the septic tank bypasses the filter. This results in harmful particles entering the tank's pump chamber and subsequently the associated drain field. These particles will eventually clog the drain field.

SUMMARY OF THE INVENTION

This invention, a Self-Cleaning Septic Tank Filter, hereinafter Filter, is designed to work in a sewage system that is connected to a septic tank with an adjoining pump chamber. A pump that periodically discharges effluent from the pump chamber into an associated drain field is required for the operation of this invention. The Filter is located in the septic tank section of the compartmentalized waste treatment tank. Effluent passes from the septic tank through a series of tubes (one of which contains filtration screens) and into the pump chamber. As the automatically operated discharge pump periodically empties the pump chamber into the drain field, the effluent level changes in the pump chamber. This causes the float in the pump chamber to rise and fall. This float is connected, by cable, to a brush in the Filter. As the float rises and falls, the brush in the Filter moves in the opposite direction. This action causes the brush to pass over the internal filter screen, keeping it free of debris.

BRIEF DESCRIPTION OF THE DRAWINGS

FIG. 2 is a rear elevation view of the self-cleaning septic tank filter of FIG. 1.

FIG. 3 is a side elevation view of the self-cleaning septic tank filter of FIG. 1.

FIG. 4 is a front elevation view of the self-cleaning septic tank filter of FIG. 1.

FIG. 5 is a top view of the self-cleaning septic tank filter of FIG. 1.

FIG. 6 is a bottom view of the self-cleaning septic tank filter of FIG. 1.

FIG. 9 is a front elevation view of the filter tube of the self-cleaning septic tank filter of FIG. 1 showing the filter screen located behind its eight circular cut-outs.

FIG. 10 is a rear elevation view, in cross-section, showing the interior of the filter tube of the self-cleaning septic tank filter of FIG. 1 with the filter screen located over its eight circular cut-outs.

FIG. 11 is a side elevation view of the weighted float of the self-cleaning septic tank filter of FIG. 1

FIG. 12 is a rear elevation view in, cross-section, showing the interior of the weighted float of the self-cleaning septic tank filter of FIG. 1

FIG. 13 is the elevation view of the brush weight depicted, in cross-section, in FIGS. 7 & 8.

FIG. 14 is the elevation view, in cross-section, showing the interior of the brush weight shown in FIGS. 7 & 8.

DESCRIPTION OF THE DRAWINGS ENCLOSED HEREWITH IS AS FOLLOWS

The version of the invention discussed herein includes:
1. Tube with circular cut-outs along two sides—Filter Tube.
2. Tube with an elongated section cut from all but the top portion of the tube—Transfer Tube.
3. Connecting and Cleanout tube—Four-way Connector.
4. Tube with an angled cut at one end—Discharge Tube.
5. Tube cap with a half-moon section cut from the top and side and a threaded hole placed in the center of the top—Filter Tube Cap.
6. Conduit threaded on one end—Conduit.
7. Threaded plug—Plug.
8. Tube cap with a half-moon section cut from the top and side and a large hole cut into the center of the top—Transfer Tube Cap.
9. Tube Cap—Weighted Float Cap.
10. Short Tube—Weighted Float Tube.
11. Long Brush with a core threaded on one end and an eye on the other—Brush.
12. Metal shot—Weight.
13. Internal Filter Screen
14. Pulley, eye bolt, washer and nut—Pulley Unit.
15. Eyebolt with washer and nut—Eyebolt.
16. Pliable ball—Shock Absorber.
17. Supple cord—Cable
18. Bolt with washers and nut—Insert Bolt.
19. Twist wire—Wire.
20. Carriage bolt with washers and nuts—Spacer Bolt.
21. External Filter Screen.
22. Four-way tube cap with attached short tube—Cleanout Cap.
23. Screw and Washer—Screw
24. Small tube cap—Brush Weight Cap.
25. Connecting Tube.
26. Brush Nut.
27. Hose Clamp—Clamp.

Figure 1:
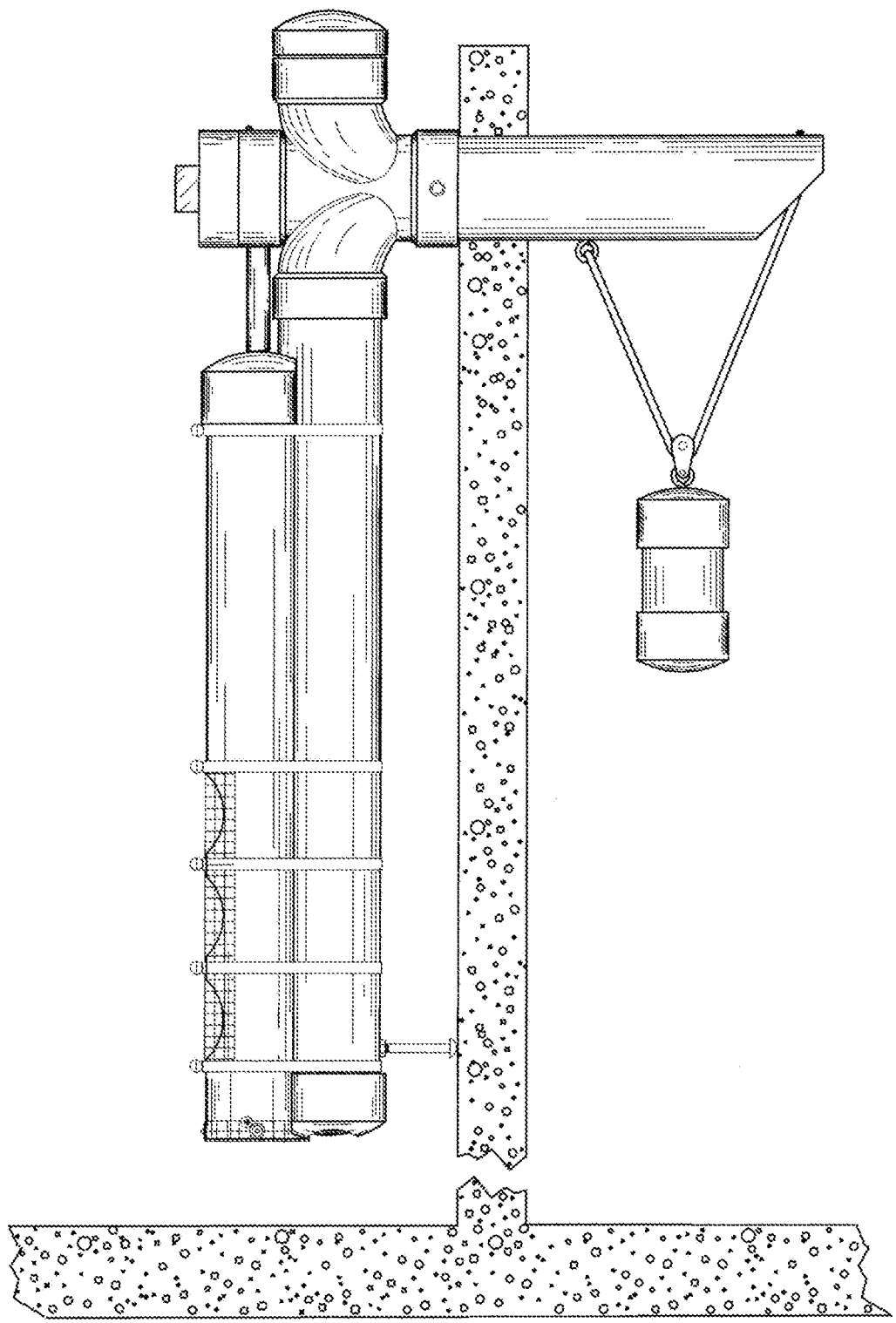
FIG. 1 is a side elevation view of a septic tank interior having an automatic cleaning feature according an embodiment of the invention.
Figures 7, 8:
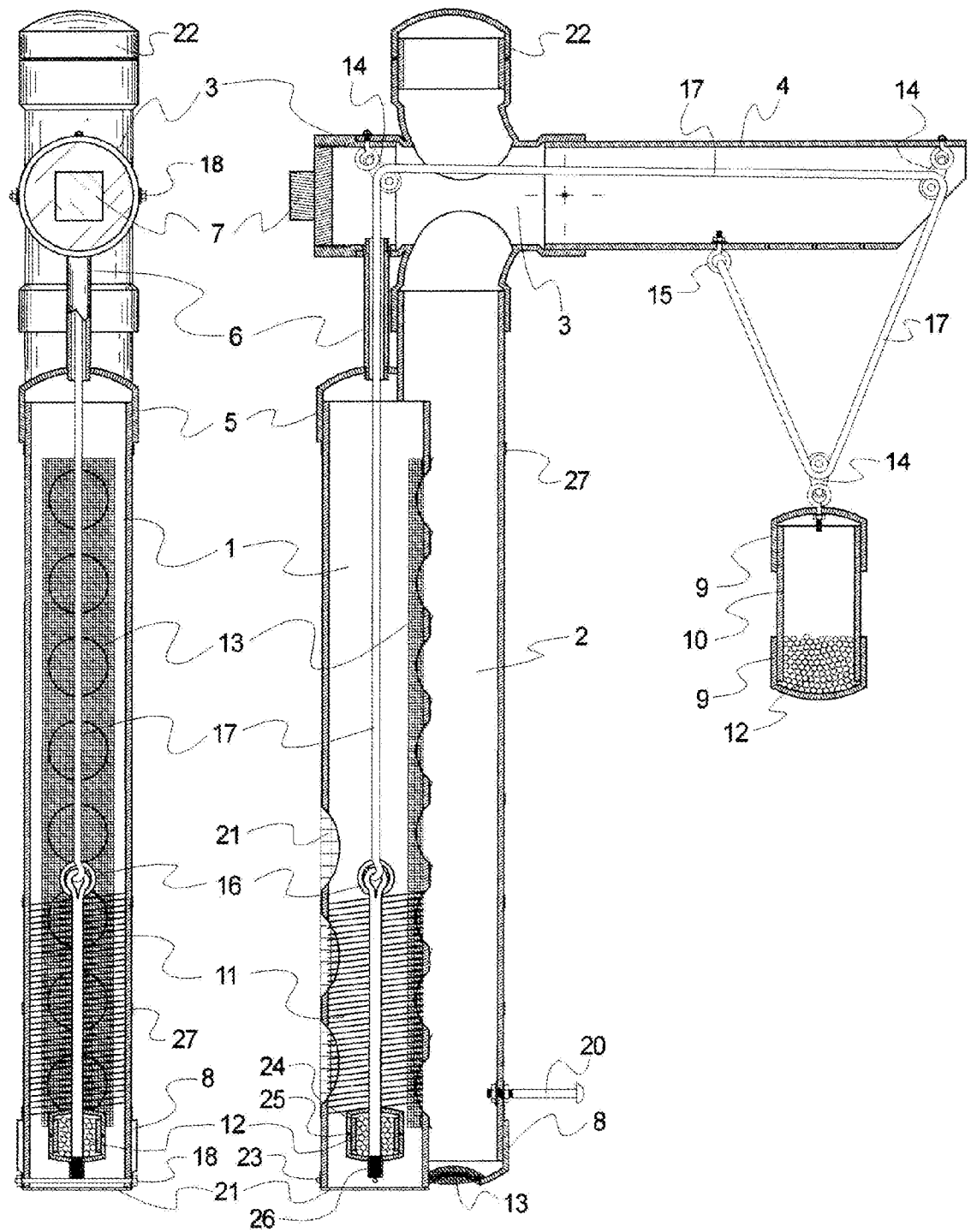
FIG. 7 is a rear elevation view of the self-cleaning septic tank filter of FIG. 1 showing, in cross-section, the interior of the filter tube in association with the complete filter.
FIG. 8 is a side elevation view, in cross-section, of the self-cleaning septic tank filter of FIG. 1 showing, in cross section, the interior of all parts of the filter and its weighted float.

Orientation of the drawings in FIG. 1 is such that it shows, in elevation, the right side of the invention as it would appear with its Discharge Tube 4 penetrating the dividing wall of a compartmentalized waste treatment tank. The rear of the invention is to the left. FIG. 2 is the rear elevation and shows Filter Tube 1, External Filter Screens 21, Screw 23, Clamps 27, Filter Tube Cap 5, Transfer Tube 2, Conduit 6, Four-way Connector 3, Insert Bolt 18, Plug 7 and Cleanout Cap 22. FIG. 3 shows the same aforementioned items plus Transfer Tube Cap 8, Spacer Bolt 20, Discharge Tube 4, Eyebolt 15, Cable 17 and attached Weighted Float FIG. 11 with its Pulley Unit 14, Weighted Float Cap 9 and Weighted Float Tube 10. FIG. 4 is the front elevation showing best the Insert Bolt 18. FIG. 5 the top view and FIG. 6 the bottom view showing best the lower External Filter Screen 21, and the Transfer Tube Cap 8 with the Internal Filter Screen 13 as it appears pressed into the Transfer Tube Cap 8. FIG. 7 depicts a sectional view in elevation of the Filter Tube 1, showing Internal Filter Screen 13 and Insert Bolt 18 plus elements noted in the lower portion of FIG. 8. FIG. 8 best shows the relationship of the moving parts of the invention. They are: Weighted Float FIG. 12 (showing components Pulley Unit 14, Weighted Float Cap 9, Weighted Float Tube 10 and Weight 12), Cable 17, Pulley Units 14 and Brush 11 with its attached Shock Absorber 16, Brush Weight FIG. 14 (showing components Brush Weight Cap 24, Connecting Tube 25 and Weight 12) and Brush Nut 26. The positioning and attachment of the Internal Filter Screen 13 with Wire 19 to the Filter Tube 1 is best shown in FIGS. 9 & 10; with FIG. 10 having the Brush 11 and associated components eliminated from view. FIGS. 11 & 13 are views in elevation of the Weighted Float and Brush Weight respectively.

DETAILED DESCRIPTION OF THE INVENTION

The invention consists of four primary sections; Filter Tube 1, Transfer Tube 2, Four-way Connector 3 and Discharge Tube 4, and two primary moving parts; Weighted Float FIG. 11 and Brush 11.

A Filter Tube 1 is cut to length and holes are drilled along two sides. One set of holes is fewer and slightly larger than the other. On the inside of the Filter Tube 1 and conforming to its interior contour, the Internal Filter Screen 13 is placed over the smaller holes and secured with Wire 19. FIG. 9 is a view in elevation of the Filter Tube 1, showing the Internal Filter Screen 13 behind the cut-outs. FIG. 10 is a sectional view in elevation of the Filter Tube 1, showing the placement of the Internal Filter Screen 13 over the cut-outs.

A half-moon section is cut from the top and side of the Filter Tube Cap 5. Next a hole is drilled and threaded into the top and a Conduit 6 placed therein. The Filter Tube Cap 5 is then placed on top of and fused to the Filter Tube 1. On the outside of the Filter Tube 1, the External Filter Screen 21 is wrapped over the larger holes.

The Transfer Tube 2 is cut to length and along one side an elongated opening is cut from all but a small section at the top. Near the bottom of the tube, opposite the elongated opening, is inserted a Spacer Bolt 20. A half-moon section is cut from the top and side of the Transfer Tube Cap 8. Next a large circular opening is cut from the top of the Transfer Tube Cap 8, and a section of Interior Filter Screen 13 is pressed into place over the opening. The Transfer Tube Cap 8 is then placed on the bottom of the Transfer Tube 2 and fused thereto.

The Weighted Float FIG. 11 is constructed by fusing the Weighted Float Cap 9 to the bottom of the pre-cut Weighted Float Tube 10. Next a specified amount of Weight 12 is placed therein. A Pulley Unit 14 is inserted into the other Weighted Float Cap 9, and the combination is fused to the top of the Weighted Float Tube 10. The Brush Weight FIG. 13 is constructed by first drilling holes in the Brush Weight Caps 24, taping over the hole in the lower cap and fusing it to the bottom of the pre-cut Connecting Tube 25. The other Brush Weight Cap 24 is fused to the top of the Connecting Tube 25, and a specified amount of Weight 12 is inserted through its opening. FIGS. 12 & 14 depict the vertical sections of the Weighted Float and Brush Weight respectively showing the placement of Weight 12 therein.

FIG. 8 is an elevation in cross section showing the Filter Tube 1, placed lengthwise into the elongated opening in the Transfer Tube 2, so that the smaller set of holes protrude into the Transfer Tube 2. The two tubes are held together with Clamps 27, most of which also hold the External Filter Screen 21 in place. FIGS. 2 & 3 are exterior views in elevation of the Filter Tube 1, showing External Filter Screens 21 over the larger cut-outs and secured with Clamps 27.

As shown in FIG. 8, a Pulley Unit 14 is attached to the inside top of the plugged end of the Four-way Connector 3. Another Pulley Unit 14 is attached to the inside top of the outflow end of the Discharge Tube 4. The Four-way Connector 3 is placed on top of the Transfer Tube 2 and fused thereto in such a manner that allowed Conduit 6 to protrude through a previously drilled hole in the lower rear of its underside. The Discharge Tube 4 is inserted into the outflow (right) end of the Four-way Connector 3 and secured by means of an Insert Bolt 18, as best shown in FIGS. 3 & 4.

A Brush 11 has the Brush Weight FIG. 13 forced onto the lower threaded end of its core breaking through the taped end. The Brush Weight FIG. 13 is then secured to the core with the Brush Nut 26. A Shock Absorber 16 is slipped over the end of the Cable 17. The Cable 17 is then attached to the eye of the Brushes' 11 core and the Shock Absorber 16 is slid down the Cable 17 until it covers the eye of the Brush 11. This combination is inserted into the Filter Tube 1 and held in place by the insertion of Insert Bolt 18. The Cable 17 is threaded through the Pulley Units 14, including the one on the Weighted Float FIG. 11, and attached to an Eyebolt 15 located on the bottom of the Discharge Tube 4.

A threaded Plug 7 is placed in the open end of the Four-way Connector 3, and a Cleanout Cap 22 is inserted on its top.

FIG. 6 shows best the External Filter Screen 21, attached by Screws 23, to the bottom of the Filter Tube 1.

How the Invention Works:

The invention is now assembled, with FIG. 1 showing in elevation the right side view of the Filter in its operating position with its Discharge Tube 4 penetrating the wall between the septic tank and pump chamber. The Weighted Float FIG. 11 will rise and fall as the effluent level fluctuates within the pump chamber. This vertical movement of the Weighted Float FIG. 11, which is tethered by Cable 17 to the Brush 11, will cause the Brush 11, located in the Filter Tube 1, to move up and down. In doing so, it will pass over the Internal Filter Screen 13. This action will keep the Internal Filter Screen 13 free of debris and allow for the free flow of effluent from the septic tank, through the Filter and into the pump chamber. The Brush 11 should have little effect on the External Filter Screens 21.

How to Use the Invention:

The Filter's Discharge Tube 4 is inserted into the pre-existing drain hole located in the dividing wall located between the septic tank and pump chamber of a compartmentalized tank. The Four-way Connector 3, being fused to the rest of the Filter, is then slipped over the end of the Discharge Tube 4 and secured by the insertion of Insert Bolt 18. The effluent in the pump chamber is reduced to its lowest level. The Weighted Float FIG. 11 is placed on the surface of the effluent. The Cable 17, having previously been attached to the Brush 11 in the Filter Tube 1 and passed through the Pulley Units 14 (including the one on the Weighted Float FIG. 11) is pulled taunt and attached to the Eyebolt 15.

The Filter is now ready to operate automatically. The effluent level in the pump chamber will rise due to the flow of effluent from the septic tank through the Filter and into the pump chamber. This causes the Weighted Float FIG. 11 to rise. This in turn releases tension on the Cable 17, allowing the Brush Weight FIG. 13 to pull the Brush 11 down through the Filter Tube 1 and across the Internal Filter Screen 13 to the stop provided by the Insert Bolt 18. Once the effluent in the pump chamber is elevated to a certain level, the pump chamber pump is automatically activated. This ejects effluent from the pump chamber into the associated drain field. As the effluent level in the pump chamber is lowered, the Weighted Float FIG. 11 drops. The Weighted Float FIG. 11, being heavier than the Brush 11 and its associated Brush Weight FIG. 13, increases the tension on the Cable 17. This in turn, causes the Brush 11 to be pulled upward, again passing over and again cleaning the Internal Filter Screen 13. This operation will continue as long as waste flows into the septic tank, and the pump within the pump chamber ejects effluent into the drain field.

Whenever the septic and pump chamber tanks are serviced (pumped clear of effluent and solids) the filter can be cleaned by removal of the Cleanout Cap 22 and spraying water down both the Filter Tube 1 and the Transfer Tube 2. The openings provided by the Internal Filter Screen 13 in the Transfer Tube Cap 8 provide the means and is for the purpose of cleaning the Transfer Tube 2.

The invention claimed is:

1. An automatic cleaning apparatus for a septic tank filter comprising a brush operable to move across a screen disposed internally of the filter, the brush being tethered, via a cable and at least one pulley, to a weighted float disposed in an effluent pump chamber associated with the septic tank such that the brush moves vertically across the screen with vertical changes of the level of effluent in the pump chamber.

\* \* \* \* \*